United States Patent Office 3,127,450
Patented Mar. 31, 1964

3,127,450
PROCESS FOR THE PREPARATION OF KETALS
Nicholas B. Lorette and William L. Howard, Lake Jackson, Tex., assignors to The Dow Chemical Company, Midland, Mich., a corporation of Delaware
No Drawing. Filed Mar. 2, 1959, Ser. No. 796,288
3 Claims. (Cl. 260—611)

The present invention relates to a method for the preparation of ketone acetals and more particularly to a new and useful method for the separation of the methanol of reaction from the reaction mixture by azeotropic distillation employing an inert organic solvent.

It is an object of this invention to provide a method of preparing ketone acetals which efficiently uses the reactant ketal to give high conversions and yields of the product ketone acetals. A further object of this invention is to provide a method convenient for the preparation of mixed acetals, i.e. in which the alcohol derived groups are different. A still further object is to provide a method for preparing ketone acetals which will avoid the production of unsaturated ethers as by-products.

It has now been found that substantially any ketone aliphatic-, cycloaliphatic- or aromatic-acetal can be prepared in good yields by reacting any primary or secondary alcohol with a ketone dimethyl acetal and azeotropically removing the methanol of reaction as formed. The azeotrope, formed by methanol and an inert organic solvent should be one having a boiling temperature below that of the azeotrope of ketone dimethyl acetal and methanol.

According to the method of the present invention compounds can be prepared which are characterized by the general formula

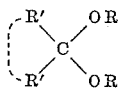

wherein each R represents an aliphatic or cycloaliphatic organic radical, the residue of an hydroxy-containing compound having from 2 to 6 or more carbon atoms inclusive, and which radical may contain halogen or oxygen substituents; and wherein each R' represents an aliphatic, cycloaliphatic or aromatic organic radical having from 1 to 6 carbon atoms inclusive and which may be joined together to form a cycloaliphatic ring. Some of the compounds falling within the above classification are new and have been found useful as fuel additives.

Thus, substantially any ketone dialkyl acetal can be prepared according to the general reaction

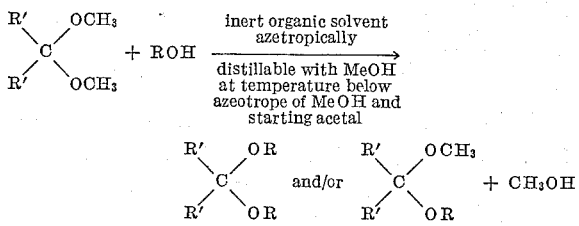

Substantially any alcohol having two or more carbon atoms can be employed in accordance with the present invention. Thus, one can employ the monohydric and polyhydric primary, or secondary alkanols, alkenols, chloroalkanols, alkoxyalkanols, cycloalkanols, arylalkanols and the like. For example, one can employ ethanol, propanol, 2-propanol, butanol, 2-butanol, pentanol, 2-pentanol, 3-pentanol, 2-methylbutanol, 2-methylbutan-3-ol, cyclohexanol, allyl alcohol, methallyl alcohol, 2-chloroethyl alcohol, methoxyethanol, 2-ethoxypropanol, benzyl alcohol, the polyols, such as polyalkylene glycols having molecular weights of from 100 or more, and the like.

Various ketone dimethyl acetals can be employed in accordance with the present invention. Thus, the dimethyl acetal of cyclohexanone, acetone, methyl ethyl ketone, diethyl ketone, methyl isobutyl ketone, acetophenone, and the like can be employed.

The reaction proceeds with production of the desired product at temperatures between about 0° and 120° C. However, for most compounds it is desirable to employ a temperature within the range of from about 20° to 80° C. Below this range it is necessary to use special cooling equipment to condense the azeotrope and above this temperature range undesirable by-products are obtained, i.e., unsaturated ethers.

The ratio of reactant alcohol to reactant ketal determines the composition of the product. If the mixed, or unsymmetrical, acetal is desired, one mole or less of the alcohol per mole of ketal should be reacted. A ratio of 2:1, or greater, will favor the formation of the symmetrical product.

In order for the process to be operated successfully, the inert organic solvent-methanol azeotrope must distill at a temperature below that of the reactant acetal-methanol azeotrope if such exists. Pressure is not critical and ordinarily is atmospheric. The pressure can be advantageously lowered if the distillation at atmospheric pressure tends to produce an unsaturated ether as a by-product. The acid catalyst is preferably neutralized prior to the separation and recovery of the products in order to prevent undesirable side reactions.

If the azeotrope-forming solvent is not used, the MeOH produced in the reaction will frequently remove the starting ketal as an azeotrope containing up to 50 percent of the ketal since this azeotrope boils lower than the other components in the reaction mixture. An advantage of the process is that addition of the solvent allows the removal of the MeOH essentially free of the ketal. A further advantage of this process is that the addition of the low boiling inert organic azeotroping solvent makes possible the removal of the methanol at a lower temperature of the reaction mixture thereby reducing the tendency toward by-product formation. A still further advantage of this process is that by suitable choice of solvent the azeotrope of methanol and the solvent may be easily separated by a simple water-wash to recover the solvent for re-use. This, of course, requires that the solvent be insoluble in water. Hexane is particularly suitable for this manner of operation. Other suitable solvents include the dichloroethanes and dichloropropanes, monochlorobutanes, pentane, benzene, cyclohexane, cyclohexene, hexene, methylcyclohexane, heptane and the like.

The following examples are illustrative of the method of the present invention.

EXAMPLE I

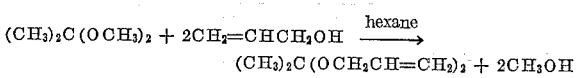

A solution composed of 520 g. (5 moles) of acetone dimethyl acetal, 639 g. (11 moles) of allyl alcohol, 500 ml. of commercial grade hexane and 0.5 g. of p-toluenesulfonic acid was distilled through an efficient glass-packed column that was equipped with an automatic take-off head. The hexane forms a binary azeotrope (47–49°, approximately 20–22 percent methanol) with methanol and in this way the methanol was removed. After each cut, hexane was added to the reaction container. A 100 ml. aliquot of each cut was washed with water to determine the amount of water-soluble material (presumably methanol) present. Take-off was as rapid as consistent with maintaining the overhead temperature at or below about 50° C. The following cuts were collected during the distillation of the hexane-methanol azeotrope.

| Cut No. | Maximum Overhead, T° | Distillation Take-Off Rate, Percent | Ml. | Percent Water-Soluble | Materials Added to Reactor After Cut Taken |
|---|---|---|---|---|---|
| 1 | 48 | 20 | 270 | 22 | 250 ml. hexane. |
| 2 | 49 | 15 | 435 | 22 | 450 ml. hexane. |
| 3 | 49 | 6 | 415 | 22 | 265 ml. hexane. 204 ml. allyl alcohol. |
| 4 | 49 | 6 | 275 | (¹) | 275 ml. hexane. |
| 5 | 56 | 6 | 320 | (¹) | |

¹ The combined solution of cuts 4 and 5 contained 20 percent of a water-soluble material.

The reaction solution was made basic with a methanol solution of $NaOCH_3$ and then distilled at atmospheric pressure until the temperature in the pot reached 100°. The distillation was continued at 180 mm. and then at 50 mm. pressure where 673 ml. of acetone diallyl acetal was collected; $n_D^{25}$ 1.4228, $d_{25}$ 0.866, $b_{50}$ 80° C. This is a 75 percent yield based on the initial charge of acetone dimethyl acetal.

*Analysis.*—Calculated for $C_9H_{16}O_2$: C, 69.19; H, 10.33. Found: C, 69.41, 69.67; H, 10.62, 10.44.

EXAMPLE II

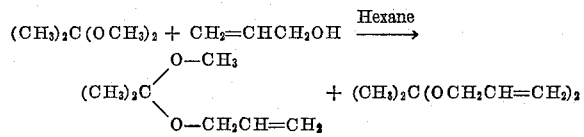

A solution composed of 670 ml. (10 moles) of allyl alcohol, 2,460 ml. (20 moles) of acetone dimethyl acetal, 0.2 g. of p-toluenesulfonic acid and 1,380 ml. of hexane was distilled at atmospheric pressure the apparatus being that used in Example I. The take-off rate at the head of the column was 20 percent at the beginning of the distillation and then reduced gradually to 10 percent as needed to maintain an over-head temperature below 50°. Three cuts of 710, 700 and 560 ml. were collected. After each cut, a volume of hexane equal to the cut was added to the distillation flask. After 1,970 ml. was distilled, the reaction mixture was made basic by adding 10 ml. of methanol in which 0.2 g. of sodium methylate was dissolved. Distillation was continued at atmospheric pressure until the distillation flask temperature reached 95°. Reduced pressure (200 mm.) was used to remove the remaining acetone dimethyl acetal and then the acetone allyl methyl acetal (1005 ml.) was collected at 40 mm. The 225 ml. residue was shown by infrared to be more than 98 percent acetone diallyl acetal. The yield of acetone allyl methyl acetal based on allyl alcohol was 66 percent and the properties were: $b_{40}$ 44°; $b_{100}$ 64°; $n_D^{24}$ 1.4040; $d_{22°}$ 0.8587. The acetone diallyl acetal residue represented 24 percent of the allyl alcohol.

EXAMPLE III

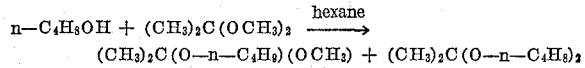

A solution composed of 548 ml. (6 moles) of n-butanol, 738 ml. (6 moles) of acetone dimethyl acetal, 0.4 g. of p-toluenesulfonic acid and 575 ml. of hexane was distilled at atmospheric pressure. The take off rate at the head of the column was 30 percent at the beginning of the distillation and that was reduced gradually to 15 percent as needed to maintain an overhead temperature below 50° (hexane-methanol azeotrope—47–48°). After each 300–350 ml. was collected, the distillation was stopped temporarily while an equal volume of hexane was added. After 1305 ml. of hexane azeotrope solution (infrared showed, in addition to methanol, 0.6 percent by volume of isopropenyl methyl ether, 2.2 percent of acetone dimethyl acetal and no n-butanol) was distilled and the reaction solution was made basic with a solution of sodium methylate in methanol. The distillation was continued at atmospheric pressure until the distilling flask temperature reached 106° during which time 412 ml. of distillate was collected. This fraction contained 45 percent by volume of acetone dimethyl acetal and a small amount of methanol, the remainder being hexane. The distillation was continued at reduced pressure, first at 100 mm., where the remaining low-boiling fraction was collected (65 ml.), then at 16 mm., where the acetone methyl n-butyl acetal was collected, and finally at 2–3 mm., where the acetone di-n-butyl acetal was collected. Based on the starting n-butanol there was a 42.6 percent yield (448 ml.) of acetone methyl n-butyl acetal and a 32.6 percent yield (221 ml.) of acetone di-n-butyl acetal.

Properties:
Acetone methyl n-butyl acetal; $n_D^{26}$ 1.3980; $d_{26}$ 0.8325; B.P. 2°/1 mm., 25°/5 mm., 37°/10 mm., 140°/760.

Acetone di-n-butyl acetal: $n_D^{26}$ 1.4103; $d_{26}$ 0.8306; B.P. 39°/1 mm.; 66°/5 mm., 75°/10 mm., 183°/760.

EXAMPLE IV

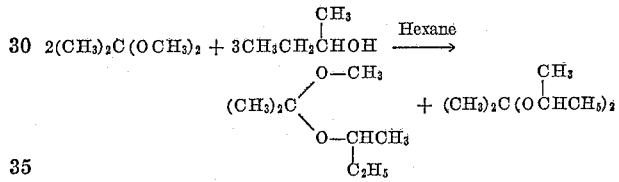

A solution composed of 1500 ml. (12.1 moles) of acetone dimethyl acetal, 1600 ml. (17.4 moles) of sec-butyl alcohol, 0.4 g. p-toluenesulfonic acid and 1300 ml. of hexane was distilled at atmospheric pressure. Cuts of 600 to 800 ml. were collected and after each cut an equal volume of hexane was added to the distillation flask. After collecting 3230 ml. of hexane-methanol distillate, the reaction mixture was made basic with 0.2 g. of sodium methylate dissolved in methanol. The distillation was continued, first at atmospheric pressure until the distillation flask temperature reached 90 to 100°, and then at reduced pressure as needed to maintain an overhead temperature of 70 to 80°. A total of 795 ml. of acetone sec-butyl methyl acetal and 263 ml. of acetone di-sec-butyl acetal was obtained. These volumes represent yields based on starting acetone dimethyl acetal of 38 and 10 percent respectively.

Acetone sec-butyl methyl acetal: $n_D^{25}$ 1.3986; $d_{26}$ 0.8368; $b_{50}$ 61°.

*Analysis.*—Calculated for $C_8H_{18}O_2$: C, 65.71; H, 12.46. Found: C, 65.74, 65.90; H, 12.58, 12.66.

Acetone di-sec-butyl acetal: $n_D^{26}$ 1.4118; $d_{26}$ 0.8337; $b_{12}$ 67°.

*Analysis.*—Calculated for $C_{11}H_{24}O_2$: C, 70.16; H, 12.85. Found: C, 70.28, 70.09; H, 12.85, 13.03.

EXAMPLE V

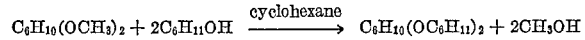

A solution containing 288 g. of cyclohexanone dimethyl acetal (304 ml., 2.0 moles) and 400 g. of cyclohexanol (4.6 ml., 4.0 moles) was acidified with 0.25 g. of p-toluenesulfonic acid. After standing for four days at room temperature, the solution was diluted with 750 ml. of cyclohexane and distilled at atmospheric pressure to remove methanol as its azeotrope with cyclohexane, the latter also serving to reduce the temperature of the distilland necessary to remove the methanol, and 400 ml. of distillate was collected at head temperatures between 54° and 77°. Extraction of the distillate with water left an organic phase of 257 ml., indicating a content of 143 ml. of water-soluble material in the distillate (theoretical, 164 ml.). The aqueous phase increased by approximately this amount. During the distillation the temperature of the reaction solution stayed in the range of 85°–90°. The distilland was then made basic by addition of excess sodium methylate. Fractional distillation in a packed column removed the excess cyclohexane and 93 ml. of liquid boiling in the cyclohexanone dimethyl acetal and cyclohexanol range. Infrared spectrum of the residue had the appearance of a cyclohexanone ketal.

Distillation of a small portions of the residue through a column packed with a three-inch length of berl saddles gave four crude fractions boiling from 40–95°, 95–110°, 110–150° and 150–160° at 4 mm. Seed crystals were prepared from the 150–160° material and used to induce crystallization in the main portion of the reaction mixture. By alternately chilling and filtering most of the crystallizable material was separated. Recrystallization several times from ethyl ether gave finally 160 g. of crystalline product melting from 42–44°. A small sample prepared for analysis had M.P. 43.0–43.5°: cyclohexanone dicyclohexyl acetal, yield 29 percent.

*Analysis.*—Calculated for $C_{18}H_{32}O_2$: C, 77.09; H, 11.50. Found: C, 77.00, 77.12; H, 11.61, 11.69.

EXAMPLE VI

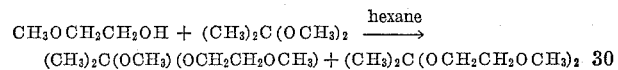

A solution composed of 10 moles of 2-methoxyethyl alcohol, 20 moles of acetone dimethyl acetal, 0.2 g. of p-toluenesulfonic acid and 1400 ml. of hexane was distilled at atmospheric pressure. After each 300 to 500 ml. fraction of the hexane-methanol azeotrope was collected, additional hexane was added to the reaction solution until a total of 2200 ml. of azeotrope material was distilled. The reaction solution was made basic wtih $NaOCH_3$ and then distilled. Based on the 2-methoxyethyl alcohol, a 55 percent yield of acetone methyl 2-methoxyethyl acetal, $d_{25}$ 0.917, $n_D^{25}$ 1.4033, $b_5$ 36° and a 27 percent yield of acetone bis(2-methoxyethyl) acetal, $d_{25}$ 0.959, $n_D^{24}$ 1.4173, $b_{6.5}$ 82°, were obtained.

*Analysis.*—Calculated for $C_7H_{16}O_3$: C, 56.73; H, 10.88. Found: C, 56.46, 56.57; H, 10.41, 10.63. Calcd. for $C_9H_{20}O_4$: C, 56.22; H, 10.48. Found: C, 56.19, 56.17; H, 10.63, 10.69.

EXAMPLE VII $2(CH_3)_2C(OCH_3)_2 + 3CH_2ClCH_2OH \rightarrow$
$(CH_3)_2C(OCH_2CH_2Cl)_2 +$
$(CH_3)_2C(OCH_3)(OCH_2CH_2Cl) + 3CH_3OH$ A solution composed of 8 moles of 2-chloroethanol, 4 moles of acetone dimethyl acetal, 0.4 g. of p-toluenesulfonic acid and 600 ml. of hexane was distilled at atmospheric pressure. After each 200 to 300 ml. fraction of the hexane methanol azeotrope was collected additional hexane was added to the reaction solution. A total of 1170 ml. of azeotrope distillate was collected. The solution was made basic with a solution of sodium methylate dissolved in methanol. Fractional distillation, first at atmospheric pressure and then at reduced pressure, resulted in a 37 percent yield of acetone 2-chloroethyl methyl acetal and a 38 percent yield of acetone bis-(2-chloroethyl) acetal. The physical properties of acetone 2-chloroethyl methyl acetal were found to be: $n_D^{25}$ 1.4219, $d_{25}$ 1.022, $b_{20}$ 61°. The physical properties of acetone bis-(2-chloroethyl) acetal were found to be: $d_D^{24}$ 1.132, $b_2$ 75°, $n_D^{24}$ 1.4513.

*Analysis.*—Calculated for $C_6H_{13}O_2Cl$: C, 47.22; H, 8.58; Cl, 23.23. Found: C, 46.98, 47.02; H, 8.55, 8.71; Cl, 23.03, 23.12. Calculated for $C_7H_{14}O_2Cl_2$: C, 41.81; H, 7.02; Cl, 35.26. Found: C, 42.08, 42.06; H, 7.02, 7.20; Cl, 35.08, 35.09.

EXAMPLE VIII

*Reaction of Polyethylene Glycol, E–400, With Acetone Dimethyl Acetal to Form a Polymer Comprising Polyoxyethylene Blocks Joined Successively by Acetal Groups*

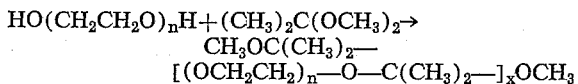

Polyethylene glycol E–400 (400 g., 1.0 mole), acetone dimethyl acetal (125 g., 1.2 moles), 1250 ml. of fractionated commercial hexane (B.P. 63–69°) 500 ml. benzene, and 0.05 g. of p-toluenesulfonic acid were combined and set for fractional distillation, with provision for magnetic stirring to maintain intimate contact between the two liquid phases. Fractional distillation gave 449 ml. of distillate in the boiling range from 47–52° C. The distilland temperature ranged from 64–71° C.

The distillate was washed with water, and the remaining organic phase occupied a volume of 372 ml., a decrease of 77 ml. due to removal of water-soluble material (theoretical amount of methanol, 82 ml.).

A few grams of potassium carbonate was added to the distilland to neutralize the acid catalyst, and most of the solvent was distilled off. The residue was then filtered free of potassium salts and a trace of a brown flocculent material, using about 100 ml. of benzene for rinsing and washing. The remainder of the solvent was then distilled off, finally keeping the distilland residue at 100–115° C. at 3 mm. pressure with stirring for three hours. Total solvent recovery was 1842 ml. The product residue weighed 441 g. (theor. 461 g.).

The product is a pale, yellow, oily liquid, miscible at room temperature with water, methanol, ethanol, acetone, benzene, ethyl ether, ethyl acetate, dioxane, and carbon disulfide; soluble hot in cyclohexane and Stoddard solvent; insoluble in hexane and heptane. It solidifies in a short range around −10° C., has a density of 1.096 g./ml. at 25° C., and viscosity 479 centistokes at 25° C. (the starting E–400 had density and viscosity of 1.22 g./ml. and 81 centistokes at 25° C.). A water solution of the material undergoes a sharp, almost instantaneous decrease in viscosity on the addition of a trace of strong acid, and the odor of acetone appears; this behavior is due to the rapid hydrolysis of the acetal groups, and the reaction is characteristically endothermic. The infrared spectrum shows the presence of only a trace amount of hydroxyl groups, and absence of carbonyl and carbon-carbon unsaturation. The number average molecular weight was found to be 1250 (ebullioscopic method).

EXAMPLE IX

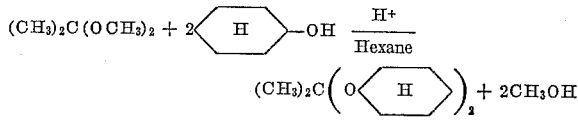

Three moles of acetone dimethyl acetal (312 g.), six moles of cyclohexanol (600 g.), one liter of hexane, and about 0.05 g. of p-toluenesulfonic acid were mixed and distilled with an automatic controller set to collect distillate when the temperature in the still head was below 55°. The distillate, which is an azeotropic mixture of hexane and methanol, was collected in portions, and each portion was washed with water. After the washing the volume of the hexane phase was measured, and the difference between the volume of azeotrope and of washed hexane was taken as the volume of methanol produced. The hexane residues were then dried and returned to the distillation mixture. In this way 203 ml. of methanol was estimated to have distilled (calculated 246 ml.) before the rate of distillation of methanol in the azeotrope became impractically slow. Then one gram of potassium hydroxide dissolved in 7–8 ml. of methanol was added to inactivate the acid catalyst, and the solvents and other volatile materials were removed by vacuum distillation until the temperature in the still head was 50°/5 mm.

The distilland residue solidified in the refrigerator. Recrystallizations from methanol and from acetone gave 355 g. of material melting from 24–25°, yield 49.5 percent.

We claim:

1. A method for preparing ketone acetals which consists essentially of reacting a ketone dimethyl acetal having the formula

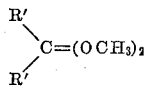

wherein each R' represents a radical selected from the group consisting of aliphatic, cycloalphatic and aromatic radicals having from 1 to 6 carbon atoms and which when aliphatic and joined together form a cycloaliphatic ring, with an alcohol having the formula ROH wherein R is the residue left by removing OH from the alcohol ROH, said alcohol being selected from the group consisting of primary and secondary alkanols, alkenols, chloroalkanols, alkoxyalkanols, cycloalkanols, and arylalkanols, in the presence of an organic liquid capable of forming an azeotrope with methyl alcohol selected from the group consisting of hydrocarbons containing from 5 to 7 carbon atoms, and chlorohydrocarbons containing from 2 to 4 carbon atoms, at a temperature of from about 0° to about 120° C. under acid conditions such that the methyl alcohol of reaction as formed is azeotropically distilled with the organic liquid; continuing the reaction and distillation until the methyl alcohol of reaction substantially ceases to form; and, finally separating from the mixture at least one of the ketals having one of the formulas $$(R')_2C=(OR)_2 \text{ and } (R')_2C=(OCH_3)(OR)$$

2. The method of claim 1 wherein one mole to two moles of the ketone dimethyl acetal are used per mole of alcohol ROH.

3. The method of claim 1 wherein at least two moles of the alcohol ROH are used per mole of ketone dimethyl acetal.

References Cited in the file of this patent

UNITED STATES PATENTS 2,229,665   Mochel _____ Jan. 28, 1941

OTHER REFERENCES

MacKenzie et al.: J. Organic Chemistry, vol. 20, No. 12 (1955), page 1700.

McCoy et al.: Jour. Org. Chem., vol. 22 (1957), pages 1175–1176.

UNITED STATES PATENT OFFICE
CERTIFICATE OF CORRECTION

Patent No. 3,127,450            March 31, 1964

Nicholas B. Lorette et al.

It is hereby certified that error appears in the above numbered patent requiring correction and that the said Letters Patent should read as corrected below.

Column 3, lines 63 and 64, the formula should appear as shown below instead of as in the patent:

column 6, line 40, for "1.22" read -- 1.122 --; lines 54 to 57, the formula should appear as shown below instead of as in the patent:

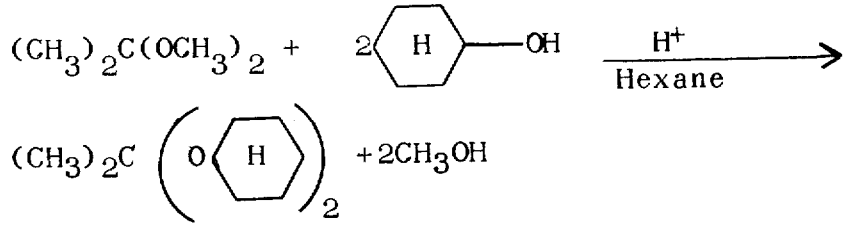

Signed and sealed this 3rd day of November 1964.

(SEAL)
Attest:

ERNEST W. SWIDER            EDWARD J. BRENNER
Attesting Officer            Commissioner of Patents